US010140884B2

(12) United States Patent
Devine-Baillargeon

(10) Patent No.: US 10,140,884 B2
(45) Date of Patent: Nov. 27, 2018

(54) METHOD AND APPARATUS FOR WRITING FORM TRAINING

(71) Applicant: Aidan Devine-Baillargeon, Somers, CT (US)

(72) Inventor: Aidan Devine-Baillargeon, Somers, CT (US)

(*) Notice: Subject to any disclaimer, the term of this patent is extended or adjusted under 35 U.S.C. 154(b) by 30 days.

(21) Appl. No.: 14/263,458

(22) Filed: Apr. 28, 2014

(65) Prior Publication Data
US 2014/0322679 A1 Oct. 30, 2014

Related U.S. Application Data

(60) Provisional application No. 61/816,934, filed on Apr. 29, 2013.

(51) Int. Cl.
*G09B 11/02* (2006.01)
*G09B 11/00* (2006.01)

(52) U.S. Cl.
CPC .............. *G09B 11/02* (2013.01); *G09B 11/00* (2013.01)

(58) Field of Classification Search
CPC ................................. G09B 11/02; G09B 11/00
USPC ........................................................ 434/166
See application file for complete search history.

(56) References Cited

U.S. PATENT DOCUMENTS

| 563,107 | A | * | 6/1896 | Watt ....................... G09B 11/02 434/166 |
| 565,374 | A | * | 8/1896 | Yarbrough ............. G09B 11/02 15/443 |
| 1,184,155 | A | * | 5/1916 | Williams ................ G09B 11/02 15/443 |
| 4,892,315 | A | * | 1/1990 | Iorlano ................... A63B 53/14 2/161.2 |
| 4,951,856 | A | | 8/1990 | Horgan |
| 6,881,065 | B1 | * | 4/2005 | Land ...................... G09B 11/02 15/437 |
| 7,794,163 | B2 | * | 9/2010 | Bush, III ............. B43K 23/004 15/443 |
| 8,591,235 | B1 | * | 11/2013 | Berman .................. G09B 11/02 434/166 |
| 2004/0186402 | A1 | * | 9/2004 | Bennett .................. A61F 5/0118 602/21 |

* cited by examiner

*Primary Examiner* — James Hull
(74) *Attorney, Agent, or Firm* — West Hill Technology Counsel

(57) ABSTRACT

An apparatus and method for training writing position can be implemented in the form of a glove with fasteners that secure a thumb, forefinger and middle finger together in a desired writing grip position. A protrusion can be applied to an outer lateral portion of the user's writing hand between a pinky finger and a wrist area, which can be mounted on a glove worn by the user, to prop up the writing hand of the user at a desired angle for writing. The protrusion can be implemented in the form of a ball that is fastened to the outer lateral portion of the glove worn on the writer's hand. The glove can be configured to be customized for a given user, such as by selecting a desired glove size, fastener position and/or position of a protrusion on the outer lateral portion of the glove between the pinky finger and the wrist. The glove is potentially useful for training a desired writing position of the user's writing hand as may be helpful in overcoming some of the challenges related to dysgraphia.

7 Claims, 3 Drawing Sheets

METHOD AND APPARATUS FOR WRITING FORM TRAINING

STATEMENT REGARDING FEDERALLY SPONSORED RESEARCH OR DEVELOPMENT (Not Applicable)

BACKGROUND OF THE INVENTION

Dysgraphia is an affliction with many different definitions; it's most general definition refers to difficulty with the act of writing, from proper placement of a writing implement and grip to the actual act of transmitting information. To date there are very few ways to correct the issue. Current items include "pencil grips" which are rubber tubes that fit around a writing end of a writing implement to provide a larger dimension portion for the user to grip. There are also "slant boards" which tilt the table or a writing surface to a certain angle. While marginally better, they do not teach the user how to write on a flat service and can be noisy and disruptive in a classroom. This leads to children (and adults) with a writing problem feeling frustrated and discouraged, and avoiding writing based assignments and not performing to full potential in school due to the sheer physical exhaustion and mental fatigue that comes from writing when faced with dysgraphia.

BRIEF SUMMARY OF THE INVENTION

The present disclosure provides in one aspect a "one size fits most" stretch glove with attachment devices on one or more of the fingers and/or thumb. For example, the attachment devices may be hook and loop fasteners, snaps, zippers, laces, elastic bands, springs or any other type of fastener or attachment mechanism suitable for securing portions of the glove together. One or more attachment devices may be may be disposed on the forefinger, middle finger and/or thumb. The attachment device(s) can, for example, be used to fasten the tips, or areas proximate to the tips, of the forefinger, middle finger and/or thumb together to provide a grip closure for holding a writing implement.

According to another aspect, a protrusion is provided to an outer lateral portion of the glove between a pinky finger and a wrist. The protrusion is positioned to impose a particular writing angle on the writing hand of the user by propping up the writing hand for proper placement of the hand for writing. According to an exemplary embodiment of this aspect, one or more attachment devices can be provided to the outer lateral portion of the glove to fasten the protrusion to the glove. The attachment devices can be configured to permit the protrusion to be located in various positions on the portion of the glove. The protrusion can be, for example, a ball or other object(s) configured to protrude from the lateral portion of the glove, and can be made detachable or repositionable. According to an exemplary embodiment of this aspect, the protrusion is a ball wrapped in one portion of hook and loop attachment material, which can then be secured to the lateral portion of the glove with the mating hook and loop attachment material that is secured to the lateral portion.

The disclosed apparatus and method permits proper hand placement and form to be imposed on the user's writing hand for handwriting. The disclosed apparatus and method implemented as a glove can thus assist in a treatment for dysgraphia. While prior techniques experienced challenges in training and/or maintaining desired hand position, angle and form, the disclosed apparatus and method treats at least part of the underlying issue. Thus, the disclosed apparatus and method help to create a solution for proper hand position and form rather than attempting to treat a symptom of an underlying problem.

The exemplary embodiment of a glove is far more compact and less disruptive than slant boards which are big, clumsy and take up valuable desk space. The glove also represents an improvement over the rubber tubes used for enlarging a writing implement grip, since the user gets the desired feel for a writing implement as is, without changes in dimension. Thus, the disclosed apparatus and method train the writer on standard size writing implements, rather than temporarily enlarged writing implements.

BRIEF DESCRIPTION OF THE SEVERAL VIEWS OF THE DRAWINGS

The disclosed method and apparatus are described below in greater detail with reference to the accompanying drawings, in which.

DETAILED DESCRIPTION OF THE INVENTION

This application claims the priority of U.S. Provisional Application No. 61/816,934, filed on Apr. 29, 2013, Entitled THE GRIPPER GLOVE.

The disclosed method and apparatus are designed to treat individuals that have difficulty with dysgraphia or other issues that impede or inhibit the ability to learn to write. According to an exemplary embodiment, a glove is provided that is configured to permit the user to place a writing implement in their hand in proper position, and to use the writing implement while maintaining proper writing form. The glove can be a stretch-to-fit and can be composed of, among other materials, cotton or nylon.

Figure 2:
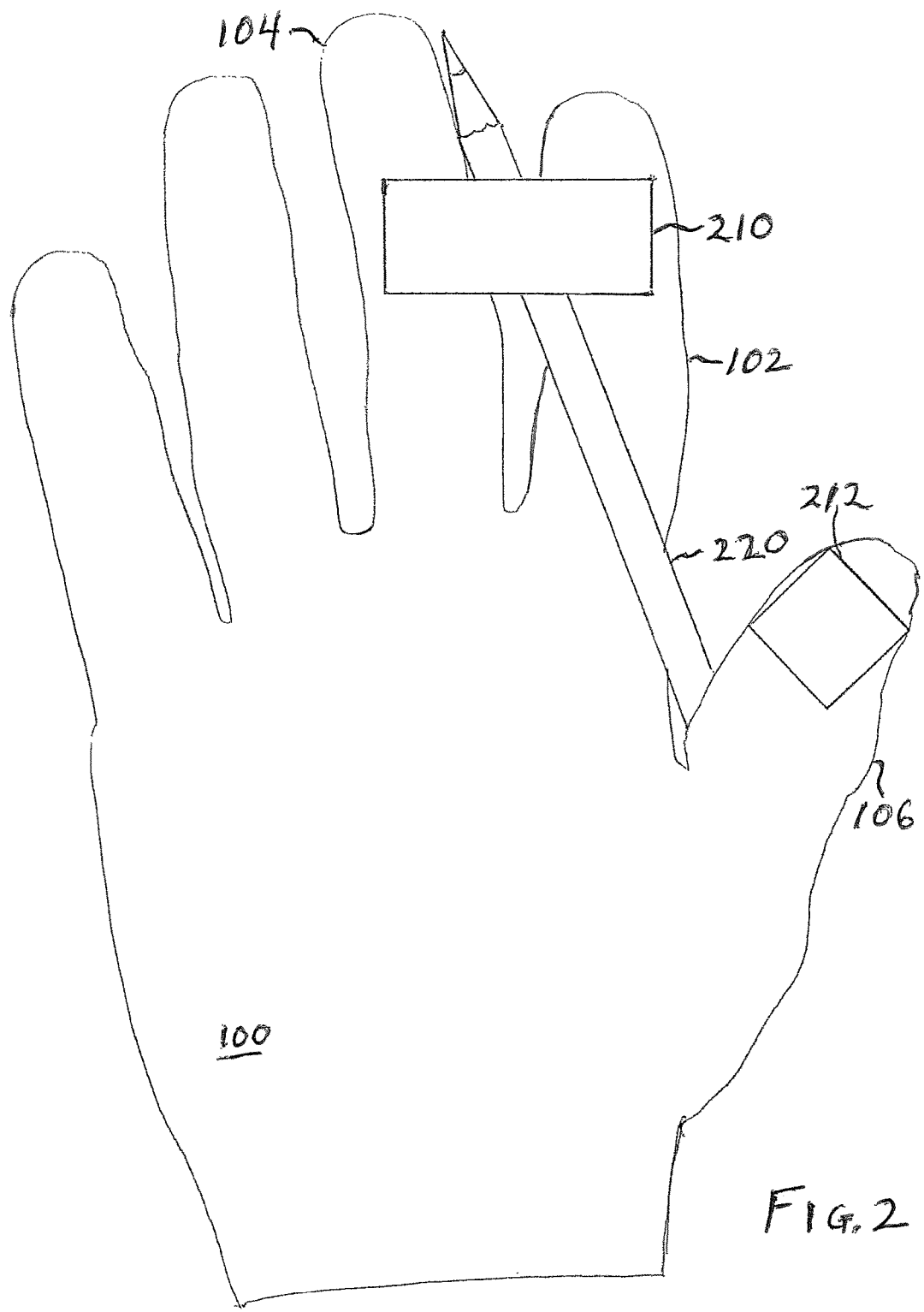
FIG. 2 is a plan view of a palm side of the glove of FIG. 1.

Referring now to FIG. 2, a glove 100 includes an attachment device 210 that can operate to connect an index finger, or forefinger 102, and a middle finger 104 to provide a basis for support of a writing implement 220 such as a pencil. Attachment device 210 is implemented either as a hook portion or as a loop portion of a hook and loop attachment mechanism, which is a commercially available fastener under the trade name Velcro. Attachment device 210 is affixed to forefinger 102 and middle finger 104 via known affixing techniques such as, for example, adhesive, sewing, rivets and/or any other technique suitable for affixing attachment device 210 to glove 100. An attachment device 212 is affixed to thumb 106, and permits cooperative engagement with attachment device 210. For example, where attachment device 210 is implemented as a hook portion or a loop portion of a hook and loop attachment mechanism or fastener, attachment device 212 is implemented as the complementary loop portion or hook portion to permit attachment devices 210, 212 to cooperatively engage with each other.

Writing implement 220 can be inserted between forefinger 102 and middle finger 104 under attachment device 210, as illustrated in FIG. 2. Writing implement 220 is positioned to extend beyond attachment device 210 when a user wears glove 100, so as to obtain a comfortable position for writing. For example, writing implement 220 may extend approximately two inches beyond attachment device 210 and may rest against middle finger 104. Forefinger 102 is then located against writing implement 220 to provide proper positioning and form for middle finger 104 and forefinger 102 in relation to writing implement 220. With writing implement 220 positioned between forefinger 102, middle finger 104 and attachment device 210, thumb 106 is brought into contact with forefinger 102 and middle finger 104. In such a position, attachment device 212 cooperatively engages with attachment device 210, thereby releasably affixing all three digits in proper alignment for writing.

Figure 1:
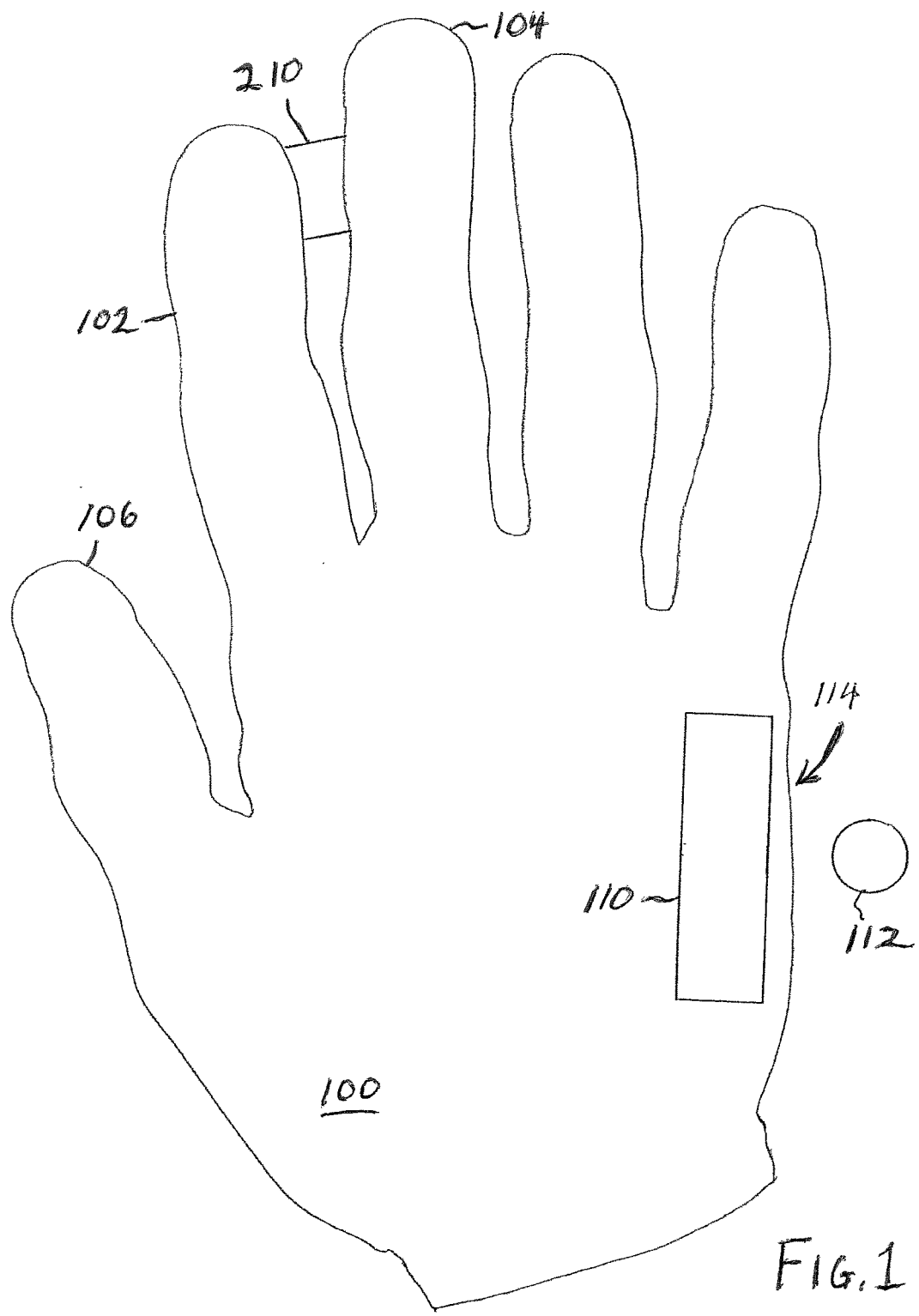
FIG. 1 is a plan view of a back side of a glove in accordance with an exemplary embodiment of the present disclosure.

Referring now to FIG. 1, on an outside back edge of glove 100 opposite the palm is an attachment device 110. Attachment device 110 is suitable for attaching a ball 112 to an outward lateral portion 114 of glove 100, located in a region between a pinky finger and a wrist. Ball 112 is configured to cooperatively attach to or engage with attaching device 110, such as by having all or a portion of an outer surface covered with hook or loop material as part of a hook and look attachment, such as maybe realized with Velcro. Any other attachment configuration can be used to join ball 112 to portion 114, including those mentioned above. Ball 112, or any other suitable object, can be fastened to portion 114, to serve as a protrusion that contributes to a user being prevented from positioning their writing hand to be supported by the protrusion. Accordingly, ball 112, or other suitable object forming a protrusion on portion 114 urges the user to position their writing hand at a desired angle with proper form, where the side of the writing hand and heel of the palm support the writing hand during writing. Ball 112 can be secured to portion 114 using any type of suitable fastener, including being sown on, fastened with snaps, zippers and the like. According to an exemplary embodiment, ball 112 or other suitable object is positioned on portion 114 of glove 100 at a customized location for the user. Thus, ball 112 can be positioned on attachment device 110 at variable locations to customize the fit and operation of glove 100. Ball 112, or any other suitable attached object props up the user's hand, for example, to obtain a desired position for writing.

One of the challenges presented with dysgraphia is holding a writing implement properly, with improper positions leading to problems in forming letters. Improper writing positions tend to produce frustration, physical pain and fatigue on the part of the writer. Often, people that are observed as having these challenges have above average intelligence, but cannot, in typical settings, produce legible writing.

One known therapy typically used to attempt to treat these challenges is a rubber tube that is positioned over the writing implement. The oversized rubber tube wraps around the writing implement and increases the circumference by up to three times. While mildly effective, the rubber tube must be applied to any writing implement that the user intends to use, which typically makes the writing implement unsuitable for other users until the rubber tube is removed. Thus, the rubber tube requires that the writing implement be customized to the writer, which can be cumbersome in practice. If the writer attempts to use a writing implement without the tube, it is typically difficult for the writer with issues related to dysgraphia to adjust to the thinner writing implement. The rubber tube is thus a temporary solution, and also can be difficult for a writer to physically accommodate, so that the level of acceptance of the rubber tube is less than optimal.

Another treatment option is a slant board, which attempts to impose a desired angle on the writing hand of the user during writing. The slant board is slightly bigger than a standard piece of paper, and can produce a stable surface for writing at a given angle. While the slant board is intended to adjust the writer's hand angle, it does not address issues that the writer may have with holding the writing implement in a desired position. Once the slant board is removed, the writer is left to attempt to maintain proper hand angle on their own, thus again representing a temporary solution. Moreover, the slant board trains the writer to write with their entire hand on an angle, so that the effectiveness of treating writing positioning challenges is limited. Also, as the writer as a student goes through different levels of school, tables and desk become smaller and this apparatus can no longer be used. In addition, the slant board when used in early grades is disruptive and calls much undo attention to the student.

The disclosed apparatus and method solves the above noted issues by addressing angle and holding grip together with a wearable solution. Ball 112 on portion 114 props the writer's hand up, and can be adjusted in location in accordance with the student's needs. Attachment devices 210 and 212 cooperate with a writing implement and each other to form a holding grip that promotes desired writing implement placement. The writer is therefore able to hold a standard size writing implement properly and can get a feel for the nuances and movement of the writing implement in its true size. Over time, the writing hand muscles are trained to a flat writing surface with the desired angle, and ball 112 can be removed while the writer continues to maintain proper writing angle due to muscle memory, which cannot be attained with the slant board. Ultimately, a the grip position of the writer becomes trained, glove 100 can also be removed, so that the writer, with trained muscle memory, can adopt a proper form and angle for writing without the need to adjust the angle of the writing surface, or the need to adjust the dimensions of the writing implement. In addition, glove 100 has a relatively small size and profile, so that it is far less conspicuous than slant boards, and far less cumbersome than rubber tubes, as well as being personalized to the writer and easily portable for use anywhere, on any typical writing surface.

Figure 3:
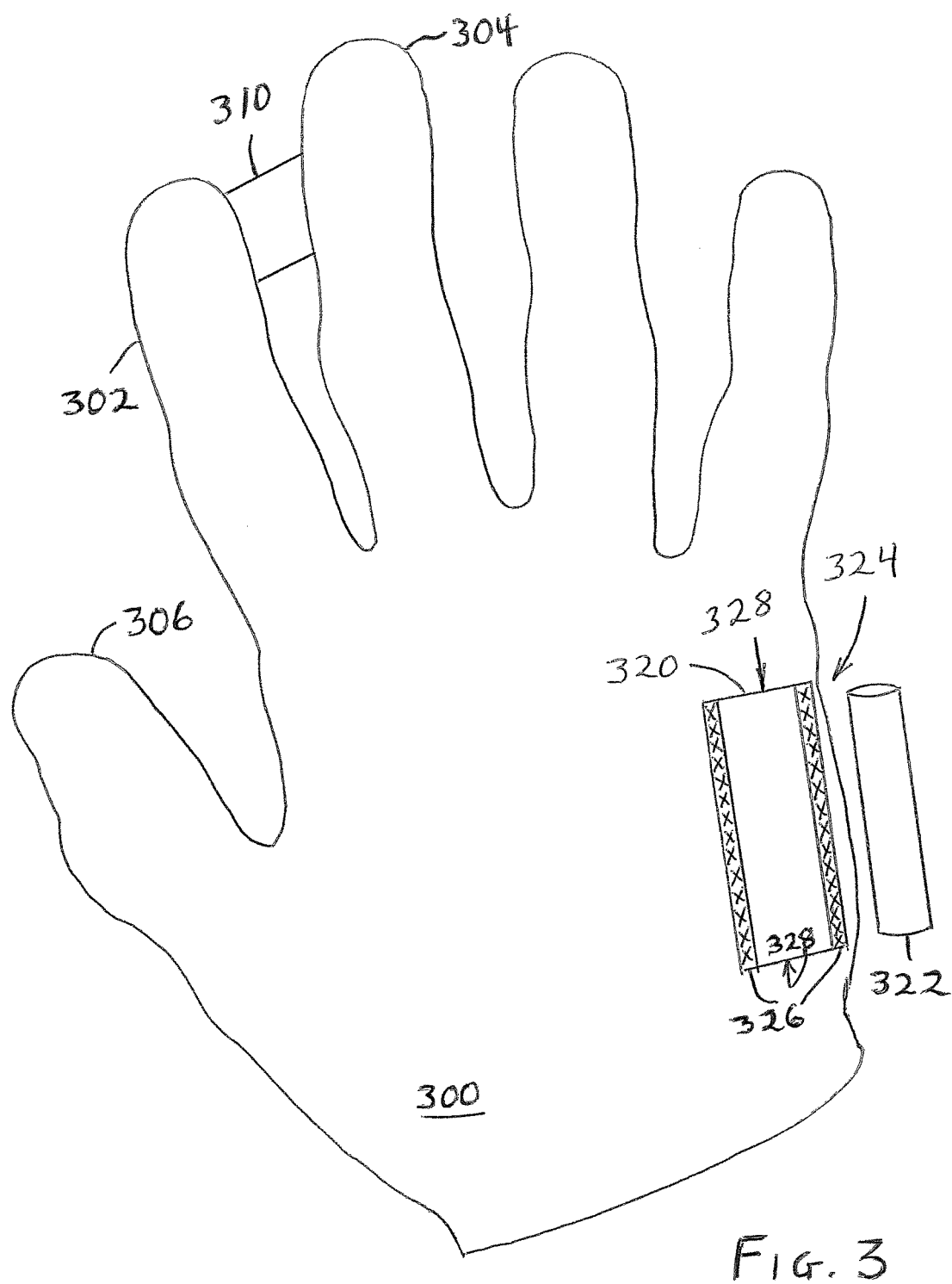
FIG. 3 is a plan view of a back side of a glove in accordance with another exemplary embodiment of the present disclosure.

Referring now to FIG. 3, another exemplary embodiment of the disclosure is illustrated as a glove 300. Glove 300 can be implemented similarly to glove 100 (FIG. 1), for example, and includes like components of an attachment device 310 to connect a forefinger 302 with a middle finger 304. A thumb 306 can be similarly constructed to thumb 106 of glove 100. An outside back edge of glove 300 opposite the palm includes a pocket 320, which is attached to glove 300 with sewing stitches 326. Pocket 320 is suitable for housing a rod 322 at an outward lateral portion 324 of glove 300, located in a region between a pinky finger and a wrist. Rod 322 can be composed of silicon, wood, or any suitable material, and is configured to be received within pocket 320, such as by sliding rod 322 into an opening 328 on either end of pocket 320. Any other attachment configuration can be used to join rod 322 to portion 324 of glove 300, including those mentioned above with respect to glove 100. Rod 322, or any other suitable object, can be fastened to portion 324, to serve as a protrusion that contributes to a user being prevented from positioning their writing hand to be supported by the protrusion. Accordingly, rod 322 inserted into pocket 320 urges the user to position their writing hand at a desired angle with proper form, where the side of the writing hand and heel of the palm support the writing hand during writing.

Pocket 320 can be constructed to use any type of suitable fastener to be attached to glove 300, including being attached with hook and loop material, fastened with snaps, zippers and the like. According to an exemplary embodiment, pocket 320 is constructed of stretchable material, so that rod 322 is resiliently retained by being biased by pocket 320. Pocket 320 may also be composed of one or more chambers, to accommodate rod 322 in different positions to customize operation of glove 320 to the user. Moreover, different size rods 322 may be used with pocket 320 to meet the needs or desires of the user for suitable support for positioning the writing hand.

It should also be noted that while designed initially with a treatment for dysgraphia in mind, the disclosed apparatus and method can be used with preschool children to teach proper hand placement to advance their writing skills, or even used by adults with motor issues or physical limitations (such as arthritis, for example) to help facilitate writing. The apparatus can be configured to be fully machine washable and can be produced in various sizes as desired. The disclosed apparatus can be produced in different colors, with different fabrics, which can be selected by the user in accordance with comfort or fit.

Although glove 100 is described as being used in conjunction with ball 112, a smooth silicon protrusion, which can be removable, can be used to make the device more integrated. Also, attachment devices 110, 210, 212 and 310 can be attached by adhesive, such as super glue, or affixed to glove 100 by sewing or other known attachment techniques. In addition, attachment device 210 can be used to secure writing implement 220 in position, such as with elastic loops, hook and loop fasteners (not shown) or any other type of securement that causes writing implement 220 to be maintained in a position relative to forefinger 102 and middle finger 104. It should be understood that attachment devices 210, 212 and 110, 112 and 310 can be composed of any fastener component suitable for being joined together, such as hook and loop fasteners, snaps, buckles, adhesive, lacing and the like. Attachment devices 210 and 310 can have a portion on the forefinger and a portion on the middle finger that are distinct, separate and independent of each other.

The desired placement of forefinger 102, 302, middle finger 104, 304 and thumb 106, 306 in cooperative alignment to grip writing implement 220 is with all three fingers having their tips located near each other. This desired alignment avoids or prevents fingers from being wrapped around writing implement 220, and/or avoids writing implement 220 being located significantly further up one supporting finger than another.

Attachment devices 210, 212, 110 and/or 310 can be fabric that is sown onto glove 100 or glove 300. Alternately, or in addition, attachment devices 210, 212, 110 and/or 310 can be relocatable so that their function can be customized to the user to permit adjustment to a customized grip and writing angle.

The disclosed apparatus and method can also be implemented with a configuration that need not be in the form of a glove. For example, structures that can be placed over the fingertips of forefinger 102, 302, middle finger 104, 304 and/or thumb 106, 306 to join those together can be used, including such structures as straps or strings or elastic bands and the like. Similarly, a structure that permits attachment of a protrusion to a lateral portion of a writer's hand between the pinky finger and wrist may be used rather than glove 100 or glove 300. Such a structure can be implemented with any suitable materials such as straps or strings or elastic bands or wax and other like materials.

For example, according to an exemplary embodiment, a forefinger, middle finger and thumb of a writer's hand can be joined to each other and a writing implement using water soluble adhesive or wax, so that a desired writing grip alignment can be dynamically formed. The adhesive can then be washed off, or the wax removed with warmed water and soap to remove the structure. Similarly, a water soluble adhesive or wax can be used to fasten a protrusion to the lateral portion of the writer's writing hand to promote desired angular alignment. Again, the adhesive can be washed off or the wax suitably removed at the end of a writing session, for example.

The foregoing description has been directed to particular embodiments of this disclosure. It will be apparent, however, that other variations and modifications may be made to the described embodiments, with the attainment of some or all of their advantages. Accordingly, it should be understood that the present disclosure is intended to cover all embodiments as may implement the functional operations described herein for training a writer on desired writing form.

What is claimed is:

1. An apparatus for writing position alignment that is wearable on a writing hand of a user, comprising:
    a wearable structure comprising:
        a glove comprising a palm side, a back side and an edge side, the glove further including at least a forefinger portion, a middle finger portion, a thumb portion, and an outer lateral back portion that is configured to be worn on at least a forefinger, middle finger, a thumb and an outer lateral back portion of the writing hand of the user, respectively;
        a first attachment device comprising a first mechanical fastener affixed in position on and connecting the palm side of the forefinger portion and the middle finger portion of the glove to each other, such that a writing implement can be located on the first attachment device opposite the palm side between the forefinger and the middle finger of the writing hand of the user;
        a second attachment device comprising a second mechanical fastener corresponding to the first mechanical fastener affixed in position on the palm side of the thumb portion of the glove, the second mechanical fastener of the second attachment device being configured to releasably engage directly with and contact the first mechanical fastener of the first attachment device, so that releasably engaging directly with and contacting the first attachment device and the second attachment device together connects the thumb portion, forefinger portion and middle finger portion of the glove together in a desired grip position, for writing with the writing implement, such that the dimensions of the writing implement felt by the user are substantially maintained and the writing implement is not fully surrounded by the wearable apparatus; and
    a protrusion releasably fastened by a mechanical fastener at a variable position on the outer lateral back portion of the glove not along the edge such that when the glove is on the writing hand of the user, the protrusion is positioned between a pinky finger and a wrist of the writing hand of the user at a position for urging the writing hand of the user to a desired position for writing wherein the edge of the writing hand of the user comprising an entire outer lateral portion and heel of a palm between the pinky finger and the wrist are permitted to directly support the writing hand of the user on a writing surface via the urging provided by the protrusion such that the edge of the glove is not resting on the protrusion.

2. The apparatus according to claim 1, wherein both of the first mechanical fastener or the second mechanical fastener comprise at least one of a hook or a loop of a hook and loop fastener.

3. The apparatus according to claim 1, further comprising a hook and loop fastener configured to be affixed in position on the portion of the wearable structure on the outer lateral back portion of the writing hand of the user and being cooperative with the protrusion to fasten the protrusion in position at the outer lateral back portion of the writing hand of the user.

4. The apparatus according to claim 1, further comprising a pocket coupled to the outer lateral back portion of the glove for housing the protrusion.

5. The apparatus according to claim 4, wherein the pocket is sewn with stitching to the glove.

6. The apparatus according to claim 1, wherein the protrusion is one or more of a ball or a rod.

7. The apparatus according to claim 1, wherein the glove is composed of stretchable material, such that a number of sizes of user hands can be accommodated by the glove.

\* \* \* \* \*